United States Patent [19]
King

[11] 3,931,099
[45] Jan. 6, 1976

[54] FIRE RETARDANT POLYESTER FIBERS
[75] Inventor: Henry L. King, Cary, N.C.
[73] Assignee: Monsanto Company, Decatur, Ala.
[22] Filed: Nov. 24, 1972
[21] Appl. No.: 309,036

Related U.S. Application Data
[63] Continuation-in-part of Ser. No. 147,168, May 26, 1971, abandoned.

[52] U.S. Cl............ 260/45.7 P; 260/75 P; 260/860
[51] Int. Cl.$^2$................................. C08K 5/53
[58] Field of Search............. 260/45.7 P, 47 P, 860, 260/930

[56] References Cited
UNITED STATES PATENTS

| | | | |
|---|---|---|---|
| 2,572,076 | 10/1951 | Fon Toy ................. | 260/61 |
| 2,636,876 | 4/1953 | Zenftman et al. .......... | 260/61 |
| 2,743,258 | 4/1956 | Coover, Jr. ............. | 260/47 |
| 2,891,915 | 6/1959 | McCormack et al. ........ | 260/2 |
| 3,027,349 | 3/1962 | Bahr et al. ............. | 260/45.7 |
| 3,406,224 | 10/1968 | McDonough ............... | 260/860 |
| 3,525,712 | 8/1970 | Kramer .................. | 260/47 |
| 3,629,365 | 12/1971 | Gardner ................. | 260/857 |

OTHER PUBLICATIONS
Hilado, "Flammability Handbook for Plastics," 1969, pp. 85 and 86.

*Primary Examiner*—Melvyn I. Marquis
*Assistant Examiner*—R. A. White
*Attorney, Agent, or Firm*—Thomas Y. Awalt, Jr.

[57] ABSTRACT

Fire retardant qualities are incorporated into polyester fibers by adding to the polymer, prior to spinning thereof into filaments, not more than about 20 percent, based on the weight of the polymer, of a compound having the general formula:

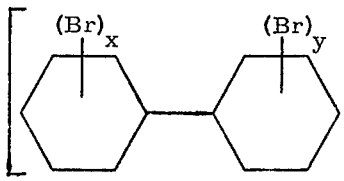

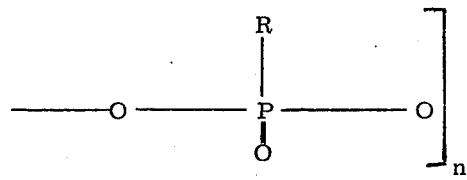

where R is a radical selected from the group consisting of alkyl, aryl, and brominated aryl; where $x + y$ equal 4–8, and where $n$ is an integer of from 2–100.

7 Claims, No Drawings

FIRE RETARDANT POLYESTER FIBERS

This is a continuation-in-part application of our copending application Serial No. 147,168, filed May 26, 1971, now abandoned.

This invention relates to polyesters produced by condensation reactions of polymethylene glycols and dicarboxylic acids or reactive derivatives thereof.

It is well known that the polymeric polyesters prepared by the condensation of a glycol or its functional derivatives and a dicarboxylic acid or a polyester-forming derivative thereof, such as an acid halid, a salt, or a simple ester of a dibasic acid and volatile monohydric alcohol are excellent fiber-forming polymers. Commercially, highly polymeric polyesters are prepared, for example, by the condensation of terephthalic acid or dimethyl terephthalate and a polymethylene glycol containing from about 2 to 10 carbon atoms, and particularly ethylene glycol, generally as taught in U.S. Pat. No. 2,465,319 and improvements thereof. These polyesters are relatively insoluble, chemically inactive, hydrophobic materials capable of being formed into filaments which can be cold-drawn to produce textile fibers of superior strength and pliability. It has long been considered desirable to impart flame retardant qualities in these polyester fibers so that fabrics, particularly those containing natural fibers such as cotton, might thereby be rendered nonburnable. A wide variety of techniques have been employed to produce flame retardancy in polyesters, including the co-polymerization and transesterification of monomers which contain halogen and phosphorus, and the incorporation of these elements into the polymer by means of additives or carriers.

By adding the phosphorus-halogen containing compound while the polymer is in melt phase, the compound, or the fire resisting elements thereof will more likely remain in the fiber, even when exposed to subsequent washing or dry cleaning operations.

Phosphorus, bromine and chlorine have long been known as fire retardant elements, particularly adaptable for use in polymeric materials. These elements have been introduced into the polymers through a number of compounds; the problem of introduction being one of compatibility with the polymeric materials and reaction. Incompatibility, of course, results in degradation of alteration of the polymer, so that it cannot be spun into filaments or fibers with acceptable properties. Bromine, chlorine and phosphorus, as elements, cannot be added to polyethylene terephthalate prior to spinning without causing serious degradation.

The addition of low molecular weight compounds to polyesters in melt form is disadvantageous usually because the volatility of the compound will cause it to be removed by distillation; it may act as a plasticizer for the polymer to such an extent that the polymer cannot be spun into fibers; and it may cause the melting point of the polymer to be lowered to such an extent that it will have limited use when spun into fibers. These disadvantages may be overcome if the elements of phosphorus and halogen are part of a larger molecule such as a polymeric material. This polymeric additive need not be compatible with the polyester in the sense that it could or would become a part of the polyester chain. It is advantageous that the phosphorus and halogen be introduced in one compound not only for convenience, but because it is believed that a synergistic action results so that lesser amounts of the additive is required than would otherwise be necessary.

It is an object of this invention to provide a compound suitable for use as a fire retardant additive in polyethylene terephthalate.

It is another object of this invention to provide a method of preparing fire retardant polyethylene terephthalate fibers.

Briefly the objects of this invention are accomplished by adding, prior to the spinning of the polyethylene terephthalate polymer into filaments, not more than about 20 percent, based on the weight of the polymer, of a compound having the general formula:

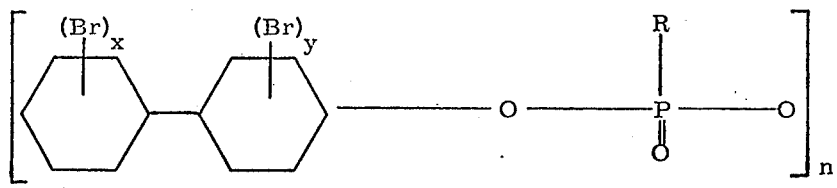

where R is a radical selected from the group consisting of alkyl, aryl, and brominated aryl; where $x + y$ equal 4–8, and where $n$ is an integer of from 2–100.

By polyester fibers, as used herein, is meant a manufactured fiber in which the fiber-forming substance is any long chain synthetic polymer composed of at least 85% by weight of an ester of a dihydric alcohol and terephthalic acid.

I have discovered that certain phosphonates do not cause serious degradation of the polyester polymer, or otherwise interfere with the polymerization reaction.

Poly(tetrabromo dipheno phenyl phosphonate), for example, can be prepared by heating with stirring equimolar amounts of phenyl phosphonic dichloride and brominated 4-4' dihydroxy biphenyl until a homogenous liquid remains. Heating is continued at about 175°C. until hydrogen chloride is evolved. Heating is continued with gradual increase in temperature until a highly polymeric material is present and hydrogen chloride evolution ceases. The polymeric material is allowed to cool and solidifies into a glassy mass which is finally ground, washed thoroughly with water, dilute caustic solution, again with water and finally with methanol. The treatment removes the unreacted starting materials. The product obtained is dissolved in chloroform, washed with water, treated with carbon and the polymer recovered by pouring the chloroform solution into methanol with rapid stirring.

The additive may be added at any convenient stage prior to spinning. Up to about 20% based on the final weight of the modified polymer can be tolerated. A minimum effective level is about 10%. As the level reaches 20, a pronounced weakness in the fiber is found. About 15% of the additive is preferred. This should provide about 5–12% bromine in the fiber. Preferred bromine and phosphorus content is about 7% and 0.7% respectively. A degree of polymerization ($n$) of at least 2 is needed to maintain a sufficiently low volatility during polymer processing. A preferred range is about 3–10. The "R" group should be inactive. Examples of acceptable radicals for "R" are methyl, ethyl, propyl, butyl, dotriacontyl, phenyl and brominated phenyl.

EXAMPLE

A 900 ml. capacity polyester autoclave is charged with 147 g. terephthalic acid, 300 ml. ethylene glycol, and 0.1 g. of antimony glycoloxide and the system purged with nitrogen. Heating is applied to the enclosed system, and when the temperature inside the autoclave has reached 100°C. to 125°C., the stirrer is started. When the temperature inside the autoclave has reached about 230°–235°C. (the pressure being about 25 p.s.i.g.), the off-vapor valve is adjusted to maintain these conditions of temperature and pressure. Water from the esterification step and some ethylene glycol are continually removed for a period of about 60 minutes. The pressure in the system is adjusted to atmospheric pressure and the heating rate continued up to a temperature of 280°C. during which time excess glycol is distilled off. 30 grams of poly-(tetrabromodiphenophenyl phosphonate) with a degree of polymerization of 3 is added to the autoclave through an addition port atop the autoclave. Pressure in the autoclave is maintained at about 2 mm. or less until a polymer having a specific viscosity of about 0.3 is formed. The polymer is extruded through a spinnerette and the filaments obtained are drawn about 5 times their original length over a hot pin at about 80°C. The drawn fiber is of an ivory color and melts at about 236°C.

The drawn fiber obtained above may be plied with glass fiber and knit into tubing of about 34 courses per inch. The technique of plying thermoplastic materials such as poly(ethylene terephthalate) with glass fiber and knitting into tubing prevents the polyester from pulling away from a flame and thus failing to propagate a flame when tested on standard flammability testers. When a flame is allowed to impinge on the modified polyester above, inclined at an angle of about 45° from the horizontal, the tubing ignites briefly after which the flame goes out and is not propagated. In contrast, a polyester control sample in which the flame retardant is omitted will burn rapidly, for a distance of about 8–10 inches from the point of ignition in a period of 7–8 seconds.

We claim:

1. A synthetic fiber in which the fiber-forming substance is any long chain synthetic polymer comprising at least 85% by weight of an ester of a dihydric alcohol and terephthalic acid and not more than about 20%, based on the weight of the polymer, of a compound having the general formula:

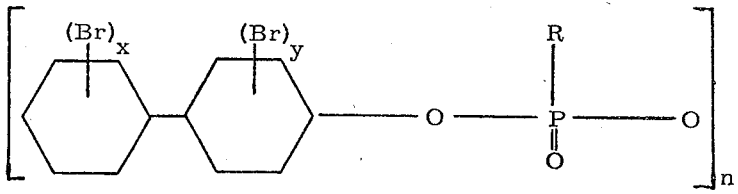

where R is a radical selected from the group consisting of alkyl, aryl, and brominated aryl; where $x + y$ equal 4–8, and where $n$ is an integer of from 2–100.

2. The fiber of claim 1 wherein said compound is present in the polymer in the amount of about 10–20%.

3. The fiber of claim 1 wherein $n$ is about 3–10.

4. The fiber of claim 1 wherein $n$ is about 3.

5. The fiber of claim 1 wherein the compound is poly(tetrabromo dipheno phenyl phosphonate).

6. The fiber of claim 5 wherein said compound is present in the amount of about 15%.

7. The fiber of claim 1 wherein said ester is polyethylene terephthalate.

* * * * *